Sept. 2, 1952 W. E. MEISSNER 2,609,002
FLEXIBLE TUBING
Filed April 29, 1946 3 Sheets-Sheet 1
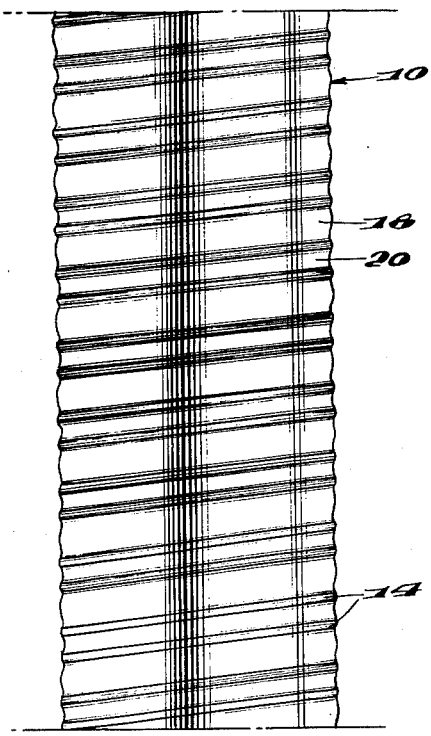
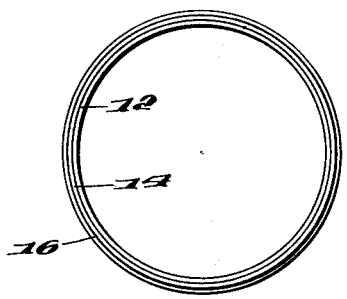
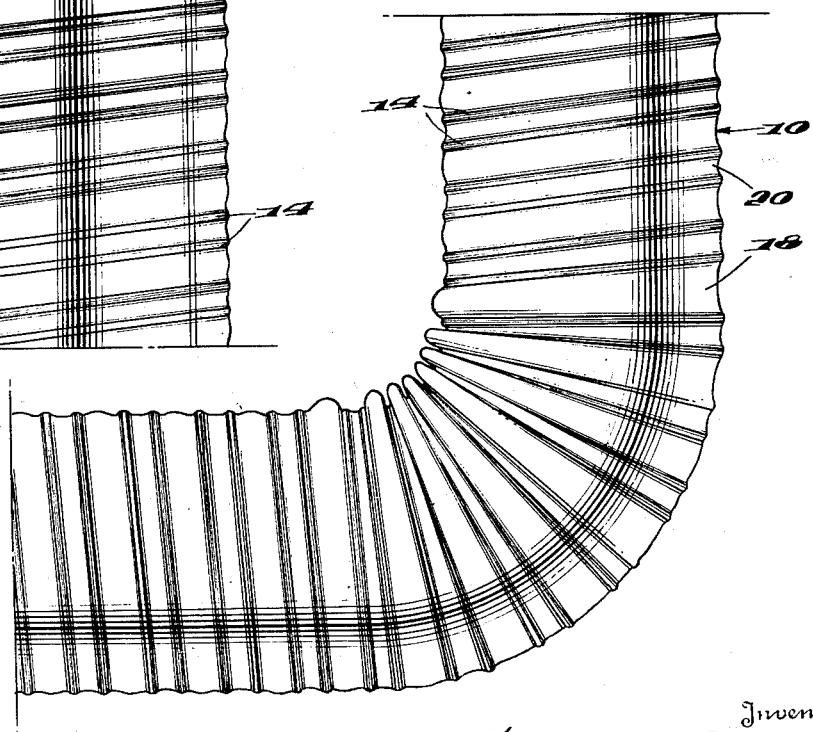
Inventor
William E. Meissner
By Leech & Radue,
Attorneys Sept. 2, 1952  W. E. MEISSNER  2,609,002
FLEXIBLE TUBING
Filed April 29, 1946  3 Sheets-Sheet 2
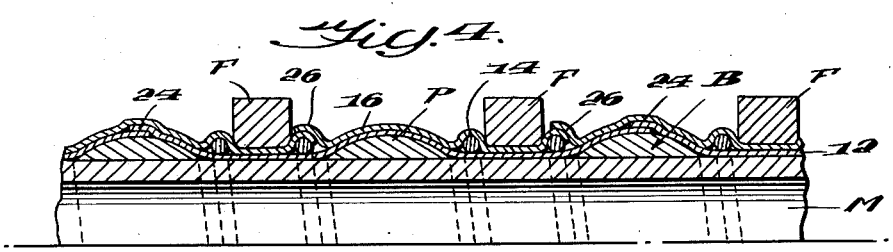
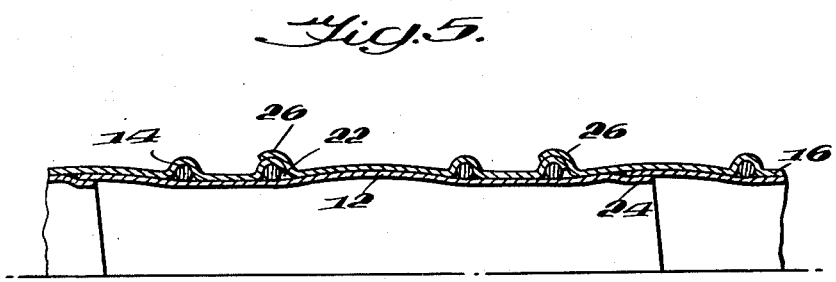
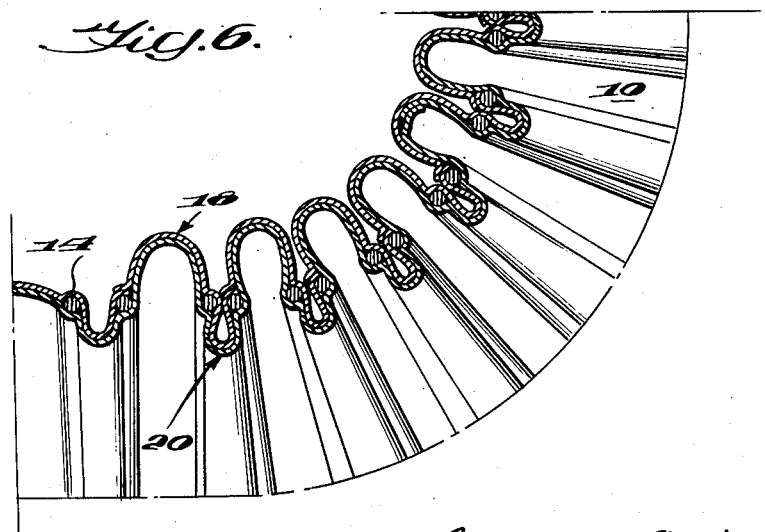
Inventor
William E. Meissner,
By Leech & Radue,
Attorneys Sept. 2, 1952     W. E. MEISSNER     2,609,002
FLEXIBLE TUBING Filed April 29, 1946     3 Sheets-Sheet 3

Inventor
William E. Meissner,
By Leech & Radul,
Attorneys

Patented Sept. 2, 1952

2,609,002

UNITED STATES PATENT OFFICE 2,609,002

FLEXIBLE TUBING

William E. Meissner, Newark, N. J.

Application April 29, 1946, Serial No. 665,864

5 Claims. (Cl. 138—56)

The present invention relates generally to flexible tubing and more particularly to tubing having a relatively thin wall incorporating in the structure thereof a helical reinforcement of spring material. It also comprehends a novel method for forming such a flexible reinforced tubing.

The tubing hitherto available for the transport of gases and liquids has not possessed the desired lightness, flexibility and adaptability to bending for the reason that, in order to provide a smooth, self-sustaining internal channel, it has been necessary to make the wall structure thick and stiff, with the result that sharp bends are precluded and even moderate bends are objectionable because of the accompanying reduction in cross-sectional area. In ordinary flexible tubing of relatively thin wall construction the folds produced at the inside of a bend and between the helical loops of the wall material tend to turn or fold into the tube space, or some folds may turn inwardly and others outwardly. Every bend offers hydraulic resistance to fluid flow, and material construction of the cross-sectional opening at the bend will in some cases add such additional resistance as to prevent the use of the tubing where solids are being conveyed with a liquid or gas.

The principal object of the invention is to provide a new and improved form of light, flexible tubing.

It is a general object of this invention to provide thin-walled flexible tubing that will be self-sustaining, freely bendable, substantially constant in cross-section when bent, and readily collapsible longitudinally.

An additional object of the invention is to provide a flexible tubing of the character indicated, the loose material of which along the smaller radius of curvature of a bend will tend to fold or accordion outwardly rather than inwardly.

Another object of this invention is to provide a simple method for constructing helically wound spiral tubing having a continuous reinforcement of spring-like characteristics in such a manner as to insure tautness of the thin-walled tubing between the reinforcing framework.

A still further and specific inventive object resides in the provision of a method for making a continuous walled thin tubing incorporating a helical spring-like reinforcement in which wall portions between the helices of the reinforcement are predisposed to bend outwardly when the tautness produced by the reinforcement is relaxed.

Further novel features of improvement contributing to simplicity of manufacture and efficiency in use will be perceived and readily understood from a consideration of the detailed description which follows.

According to the invention there is provided a flexible, thin-walled tubing of spiral or any other continuous construction having associated with the wall thereof a continuous helical reinforcement of spring-like characteristics arranged to maintain the wall of the tubing in an extended position between the successive coils of its helix and to accommodate simple or complex bending through large and small angles while at the same time maintaining a uniform internal cross-sectional area at the bend by insuring that the major portion at least of the folds thus produced extend outwardly of the tube.

In accordance with a preferred embodiment of the novel method of the invention a strip of thin-walled material is wound spirally about a mandrel of circular cross-section which has first been provided with a continuous, convexed projection in the form of a helical band extending in the same direction as the spiral wound material. A coiled reinforcing spring of appreciable pitch in its normal unstressed state is applied to the mandrel in a compressed condition, maintained by a groove defined by the helical band, and over the inner layer of the tubing wall. After an outer layer of wall material is applied over the reinforcing spring, the seams of the inner layer of wall material are sealed, the outer layer of spring-covering material and the inner layer of material are bonded or secured together, and the now impervious tubing removed from the mandrel, whereupon it will assume a form in which the spring reinforcing is extended and the material between the successive coils of the spring will be stretched out taut. The wall material between the spring coils which has been arch formed over the continuous projection provided by the helical band will have a tendency to return to the shape of an outwardly extending loop when the spring is compressed while the tubing is in use.

This combination of advantageous results derives from the characteristics of a spring wire helix having enough space between its turns to permit compression. When this type of spring is compressed a continual force is exerted tending to restore the original free state or pitch. Whatever change in diameter results from compression is in the direction of increased diameter, whether the helix is straight or curved. The spacing between the turns of the spring wire helix must also be correlated to the diameter and wall thickness of the tubing in such a manner as to accommodate flexing of the wall material away from the helix.

For a more complete understanding of the nature and objects of the invention reference is made to the accompanying drawings in which:

Fig. 1 is a side elevation of one form of the tubing employing a double helical reinforcement;

Fig. 2 is an end view of the tubing illustrated in Fig. 1;

Fig. 3 is a somewhat enlarged side elevational view illustrating the change in the configuration of this tubing when bent through an angle of approximately 90 degrees;

Fig. 4 is an enlarged longitudinal sectional view of a fragment of the tubing shown in Fig. 1 illustrating a method by which it may be formed;

Fig. 5 is a similar longitudinal section showing the shape normally assumed by the tubing after formation;

Fig. 6 shows in fragmentary longitudinal section the details of the shape assumed by the inner curved portion of a length of tubing having the construction of Figs. 4 and 5, when bent through an angle of 90 degrees;

Figure 7:
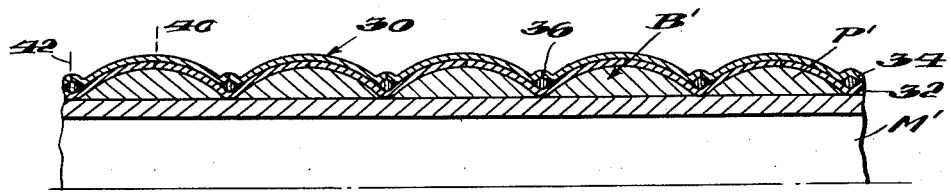
Fig. 7 is a fragmentary longitudinal sectional view illustrating a method of forming a modified tubing employing a single helical reinforcement.

In the preferred and illustrated embodiment the wall structure of the tubing is formed of an at least partially transparent material having elastomeric or rubber-like properties. Such materials are readily formable, have good resistance to abrasive and corrosive action, and are highly impervious to gas and liquids. The invention is not restricted, however, to the use of elastomeric material, as cloth fabric which has been impregnated, or coated, or laminated with such material, to make it impervious to gases and liquids may also be advantageously used. By reason of availability, and because it possesses the required basic characteristics in a high degree, the commercial forms of thermoplastic films or sheets of vinyl resins are particularly desirable. Accordingly, this invention will be described with particular reference to thermoplastic sheets or films of the vinyl base type such as are manufactured and sold by Carbide and Carbon Chemicals Company under the trade name "Vinylite." Thermoplastic resins such as these may be bonded or sealed in a variety of well known ways including singly or cojointly the use of adhesive, vulcanizing, pressure and heat.

The requirements for the framework of the tubing, comprising a distented helix of spring-like material, are best satisfied by a metal spring wire or strip of stainless steel, although there are wide ranges of commonly used materials and protective finishes which may be suitably employed for the purpose.

In its basic aspects the tubing of this invention comprises a thin flexible inner wall, an encircling spiral reinforcing spring, and an outer covering for the spring secured to the inner wall so as to provide a continuous spiral sheath or pocket formation which may turn about the spring as the tube is bent and corrugations formed. For some applications of the invention it may be preferable to provide an additional flexible armor coating over one or both sides of this basic tubing construction.

Referring to Figs. 1, 2 and 3, the numeral 10 indicates the flexible tubing in general, including a relatively thin inner wall 12 formed from a sheet of thermoplastic material and a double helix form of metal spring 14 covered by a thin flexible outer layer or wall of thermoplastic material 16.

It will be observed in Figs. 1 and 5 that the pitch of the double spring 14, which is shown in its normal extended position, is substantially greater than the distance between its adjacent parallel coils and that the correspondingly spanned portions 18 and 20 of the tube walls are maintained in a taut position that provides a smooth surface within the tubing.

When the double helix form of tubing construction 10 is given a simple bend through an angle of 90 degrees, as indicated in Fig. 3, the longer unsupported wall sections or loops 18 will be caused to fold outwardly at the inner side of the curve as best illustrated by the fragmentary longitudinal section of Fig. 6. In this particular embodiment there will be a minor reduction in the cross-sectional area of the tubing 10 due to the inward projection of the loops formed by the shorter wall sections 20 extending between the adjacent parallel coils. This reduction in cross-sectional area will amount to less than 5 per cent, which is more than compensated for by the added strength and resistance to a superior external pressure afforded by the second of the helix coils. In this construction the folding of the one loop complements and helps the folding of the one next to it and each strengthens the other since they pivot in pockets 22 around the round wire of the helix coil 14. It is desirable that the infolding section or loops 18 be as narrow as possible. This result is achieved in the illustrated embodiment by spacing the two parallel helixes a distance less than half the pitch of the double coil spring in extended condition.

When the wall is of elastomeric material the loops 20 on the outer side of the curve can stretch to some extent in accommodation.

The method of forming and constructing the double helix tubing of Fig. 1 is illustrated in the enlarged fragmentary longitudinal sections of Figs. 4 and 5. The inner layer 12 of wall material is spirally wound around a hollow cylindrical mandrel M having a continuous, convex cross-sectional protuberance P formed by a constant pitch helical band B having a flat inner surface in continuous engagement with the mandrel M, the spacing between adjacent edges of successive turns of band B being slightly greater than the spacing between the remote edges of adjacent parallel coils of the double helix spring 14. The arrangement is such that the overlapping seams 24 of the inner wall layer 12 occur at the top of every other turn of protuberance P. In other words, the width of the inner layer 12 spiral is approximately twice the distance between the helical bands B providing the protuberance P.

The outer layer 16 of wall material is spirally wound in the same direction over the inner layer 12 and the double helix reinforcing spring 14 so that the width of the strip forming layer 16 and the pitch of its overlapped edges or seams 26 corresponds to the pitch of the double helix and the overlapping comes over successive turns of the same helix member, that is, the joint follows one of the constantly spaced helixes comprising the double helix reinforcement 14.

During the adhering or securing of the two wall layers 12 and 16 to each other and at their seams 24 and 26 the cylindrical portion of the mandrel M between the successive turns of protuberance P will have applied thereto a spiral band or form F of rectangular cross-section and of such a pitch and dimension as to snugly fit between the parallel and covered coils of the double helix 14 and give the desired shape to that portion of the tubing wall structure. As previously pointed out, there will be no bonding of the spring 14 to the enclosing layers of wall material 12 and 16.

After its removal from the mandrel M the tubing 10 will be extended as shown in Fig. 5 in response to release of longitudinal compression of the double helix spring 14. This result is achieved by having the dimension of the wall material over the turns of protuberance P measured in normal pitch direction, approximately equal to the similarly measured distance between the more widely spaced, adjacent coils of the spring 14 in extended condition. Preferably this dimension of the wall material is made slightly less to insure tautness by permitting only partial release of the compression of spring 14.

The manner of forming the continuous coil pockets or sheaths 22 deserves special consideration because of the effect it has in producing inbending of the shorter loops 20 (Fig. 6). Referring to the cross section of Fig. 5, it will be noted that the major and outwardly curved part of the pocket 22 is formed by the outer wall layer 16, with very little or none of the double wall thickness between adjacent, closely spaced coils extending above a generally horizontal line connecting the centers of those coils. Consequently, when the tubing 10 is bent to the angular portion of Fig. 6 with the spring 14 compressed on the inner side of the bend, the loops 20 will be impelled inwardly and will not assume a position interfering with full compression of adjacent closely spaced spring coils. The pivotal action of pocket 22 assists in this desired result.

Figure 8:
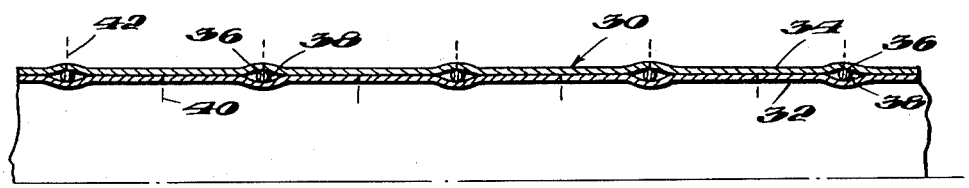
Fig. 8 is a similar longitudinal sectional view showing the shape normally assumed by the modified tubing after formation.
Figure 9:
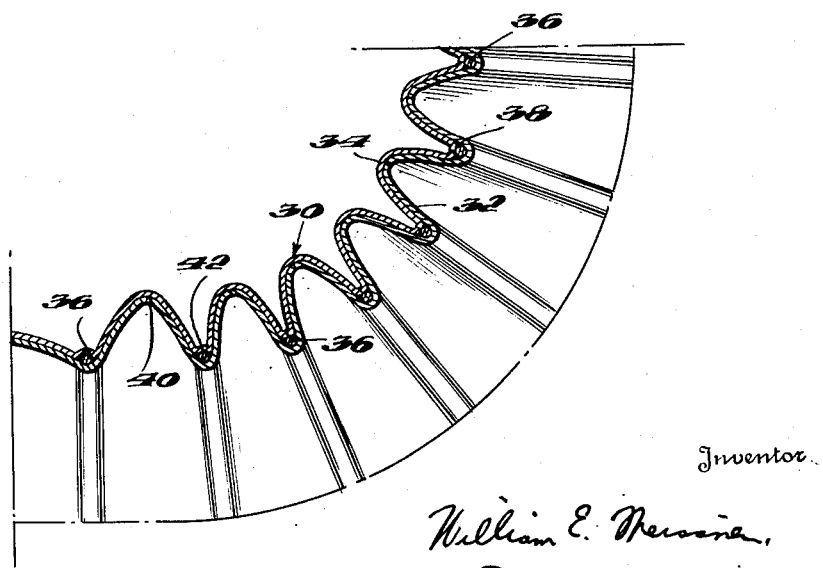
Fig. 9 shows in fragmentary longitudinal section the details of the shape assumed by the inner curved portion of the modified tubing when bent through an angle of approximately 90 degrees.

A modified form of tubing construction is illustrated in the fragmentary longitudinal sections of Figs. 7, 8 and 9. Essentially this modification comprises a tubing indicated generally as 30 and comprising an inner layer 32 and an outer layer 34 of elastomeric material similar to that described with respect to the principal embodiment. These wall layers 32 and 34 enclose the spaced coils of a single helix or metal spring 36 in a continuous spiral pocket or sheath 38 formed therebetween.

In forming the tubing 30 the inner layer 32 is applied around a cylindrical mandrel M' having on its outer face a helical, convex cross-sectioned protuberance P' with nearly contiguous turns constituting a helical band B' having a flat inner surface engaging the mandrel M'. The relatively small space between the turns of protuberance P' receive the reinforcing spring 36 in longitudinally compressed condition and within the pocket formation 38.

Preferably the inner layer of wall material 32 will be a continuous envelope such as may be formed by helically winding a strip of suitable width elastomeric, thermoplastic material around the mandrel M' so that its adjacent edges abut and the seamless joints 40, which may be sealed by fusing, will have the same pitch as the spring 36 in its extended position and will fall midway between the successive coils thereof. The also continuous outer wall layer 34 may be similarly formed from a spirally wound strip of the same composition, width and pitch as the layer 32 but preferably in staggered relation thereto so that its joints 42 will coincide with the successive coils of the spring 36 when the latter is fully extended.

The initial compression or longitudinal expansibility of the spring 36 will be at least sufficient to stretch out the wall layers 32 and 34 to the straight condition shown in Fig. 8.

Particular note is made that in Fig. 9, showing the inner curved section of an approximately 90 degree bend of the tubing 30, there is substantially no constriction of the cross-sectional area at the bend due to the fact that the single folds 42 of wall material all extend completely outward of the tubing. While, as was indicated heretofore, the single helix reinforced tubing 30 will have lesser folding strength than the double helix form, it will be found more advantageous where no internal constriction at bends is permissible and where the pressure within the tube exceeds that without.

In both the double helix form of Figs. 1 to 6 and the single helix form of Figs. 7, 8 and 9, the manner of forming or shaping the tubing wall material over spaced convexed protuberances of a mandrel predisposes the material between the helixes to bending or looping radially outward when the tubing is turned through an angle or compressed so as to release the tautness produced by the spring reinforcement. In the case of the double helix tubing this inherent predisposition of the longer loops 18 aids in the radial inbending of the shorter loops 20, which are not formed over convexed protuberances but have, nevertheless, an inbending tendency for the different reason previously explained.

From the foregoing detailed description of two embodiments of this invention it will be seen that there has been provided a flexible tubing that is extremely light, of minimum bulk, and which possesses the required tensile strength and resistance to flow conditions to satisfy the conditions previously enumerated. Among its additional advantages are the fact that it will remain physically constant over a wide temperature range—50 degrees to 170 degrees F., will withstand pulsations and vibrations, and, most important of all, can readily be bent through as much as 180 degrees to a radius of curvature equal to the diameter of the tubing and without material reduction of its cross-sectional area in any part of the bend.

Depending upon the desired conditions of use, the tubing of this invention may obviously be made of a number of other known materials having the general properties indicated as essential. When made of vinyl resin polymers, the wall of this tubing can conveniently and inexpensively be made transparent or apaque, and by use of any desired color or colors serve both decorative and identification purposes.

There are a large number of different uses for the improved form of flexible tubing provided by this invention. A few random applications of importance are: air conditioning ducts, tubing for blowers or vacuum sweepers, speaking tubes, and, in general, to the solution of all related tubing problems involving the flow of liquids or gases either with or without contained solid material.

Since this invention admits of a number of modifications in the specific materials employed and the details of tubing manufacture and construction, the scope thereof is not to be limited other than may be required by the appended claims.

Having thus described my invention, what I claim as novel and desire to secure by Letters Patent of the United States is:

1. As an article of manufacture, a compressible and bendable tubing comprising a flexible resilient tubular wall formed of at least two layers comprising a thermoplastic material, a reinforcing strand forming a helix of widely spaced courses coaxially disposed between said layers, the layers being bonded together between said courses to anchor said helix therein, and constituting a continuous spiral wall between courses of said helix, said wall having therein a stress normally biasing said wall into an arch of decreasing radius between said courses of said helix when said wall of said tubing is deformed whereby the direction of flexure of said wall arches said wall in a predetermined direction when said tubing is compressed or bent.

2. A tubing as recited in claim 1 in which the arch of the spiral wall area between courses is convex so that said wall area folds outwardly when the tubing is compressed or bent 3. A tubing as recited in claim 1 in which the wall is formed of two strips of thermoplastic material, the edges of each strip forming a spiral seam with the edges of the spiral seam of the inner strip being spaced longitudinally from that of the spiral seam of the outer strip.

4. A tubing as recited in claim 1 in which the helix is formed of two separate strands arranged in spaced parallel spiral courses.

5. A tubing as recited in claim 1 in which a second helix is enclosed between said wall layers in spaced parallel coaxial relation with the first helix, adjacent courses of the two helixes being closely spaced as compared with the spaces between successive courses of either helix thereby defining alternate narrow and wider spiral wall areas, the inner wall layer of said narrow areas lying substantially within the inner circumference of said helixes, and said wider wall areas having therein a stress normally biasing said wider wall areas into arches of decreasing radius when said wider wall areas of said tubing are deformed whereby the narrow areas fold inwardly and the wider areas fold outwardly in a predetermined manner when the tubing is deformed.

WILLIAM E. MEISSNER.

REFERENCES CITED

The following references are of record in the file of this patent:

UNITED STATES PATENTS

| Number | Name | Date |
| --- | --- | --- |
| 1,736,106 | Williamson | Nov. 19, 1929 |
| 1,797,193 | Kimmich | Mar. 17, 1931 |
| 1,810,032 | Schulthess | June 16, 1931 |
| 2,047,770 | Davis | July 14, 1936 |
| 2,245,758 | Chernack | June 17, 1941 |
| 2,272,704 | Harding | Feb. 10, 1942 |
| 2,299,520 | Yant | Oct. 20, 1942 |
| 2,321,064 | Broedling | June 8, 1943 |
| 2,396,059 | Roberts | Mar. 5, 1946 |